United States Patent [19]
Kitada

[11] Patent Number: 5,212,999
[45] Date of Patent: May 25, 1993

[54] MOTOR WITH WORM REDUCTION GEAR

[75] Inventor: Katsuyoshi Kitada, Kiryu, Japan

[73] Assignee: Mitsuba Electric Manufacturing Co., Ltd., Gunma, Japan

[21] Appl. No.: 888,183

[22] Filed: May 26, 1992

[30] Foreign Application Priority Data

Jun. 4, 1991 [JP] Japan .............................. 3-050255[U]

[51] Int. Cl.$^5$ .............................................. F16H 1/16
[52] U.S. Cl. ...................................... 74/425; 384/223; 384/245
[58] Field of Search ................ 74/89.14, 425; 384/223, 384/243, 244, 245, 246

[56] References Cited

U.S. PATENT DOCUMENTS

| | | | |
|---|---|---|---|
| 4,026,163 | 5/1977 | Merkert | 74/425 |
| 4,452,541 | 6/1984 | Carpenter | 384/223 |
| 4,790,202 | 12/1988 | Hayashi et al. | 74/425 X |
| 4,885,948 | 12/1989 | Thrasher, Jr. et al. | 74/89.14 |
| 4,993,277 | 2/1991 | Adam et al. | 74/425 |

FOREIGN PATENT DOCUMENTS

| | | | |
|---|---|---|---|
| 2650647 | 2/1991 | France | 74/425 |
| 54-67611 | 5/1979 | Japan . | |
| 56-35534 | 8/1981 | Japan . | |
| 57-19775 | 12/1982 | Japan . | |

Primary Examiner—Allan D. Herrmann
Assistant Examiner—David W. Laub

[57] ABSTRACT

In the motor with the worm reduction gear, wherein a worm is provided at an end portion of a rotary shaft, a worm wheel is in meshing engagement with the worm and rotation of the rotary shaft is reduced in speed and transmitted to load, such an arrangement is adopted that a first damper and a second damper, which are different in elasticity from each other, are provided at end portions in the axial direction of the rotary shaft, and, at an initial stage where the thrust force from the rotary shaft is low, only the elastic force of the first damper lower in elasticity acts on the rotary shaft and, at a stage where the thrust force becomes high, both the elastic forces of the first damper and the second damper act on the rotary shaft.

11 Claims, 3 Drawing Sheets ic curve showing the relation-
MOTOR WITH WORM REDUCTION GEAR

BACKGROUND OF THE INVENTION

1. Field of the Invention

This invention relates to a motor with a worm reduction gear, and more particularly to improvements in a thrust bearing construction, for example, to an effective one utilized in a thrust bearing of a motor with a worm reduction gear for driving a wiper device mounted on a motor vehicle.

2. Related Art Statement

In general, in a wiper device for wiping window glasses of a motor vehicle and the like, it is necessary to satisfactorily reduce the speed of rotation of a motor and therefore a worm reduction gear is used in the wiper driving device. The motor with the worm reduction gear is of such an arrangement that the motor is provided at the forward end of a motor rotary shaft thereof with a worm and a worm wheel in meshing engagement with this worm, and the rotation of the motor rotary shaft is reduced in speed by the worm and the worm wheel and transmitted to a wiper shaft.

When the motor with the worm reduction gear in this arrangement is connected to the wiper device, a thrust force in the axial direction acts on the motor rotary shaft at the time of the reversion of a wiper blade. Therefore, in the conventional motor with the worm reduction gear, such an arrangement that thrust bearings are provided at end portions in the axial direction of the motor rotary shaft has been adopted in general.

As for the above-described thrust bearings, there have been known one in which resin is filled up in bearing containers as described in Japanese Patent Laid-Open No. 54-67611, for example, another one in which spring plates are used as disclosed in Utility Model Publication No. 56-35534, the other one in which vibration absorbing members are used as disclosed in Utility Model Laid-Open No. 57-197754, and the like.

However, in the thrust bearing in which the resin is filled up in the bearing containers, since thrust adjusting should be performed by the fill-up of the resin, control in molding of the resin becomes very difficult. And, moreover, when the resin is worm out by the thrust force, looseness in thrust takes place.

Furthermore, in the thrust bearing in which dampers such as the spring plates and the vibration absorbing member are used, it is necessary to set an original value of damper displacement highly in consideration of errors in dimensions in the direction of thrust of various parts. As a result, prepressures due to the dampers such as the spring plates, the vibration absorbing members and the like is increased, whereby the loss of the motor is increased at an initial stage. That is, in order to effectively moderate the high thrust force acting in the axial direction of the motor rotary shaft at the time of the reversion of the wiper blade, it becomes necessary to use dampers having high elasticity. If such dampers are used, the dampers act on the rotary shaft as high forces even in the case of a small displacement, whereby the prepressures to the rotary shaft becomes high, so that the loss of the motor becomes large.

In order to decrease the prepressures to the rotary shaft due to the dampers, the value of displacement of the dampers at the initial stage should be set at low values. For this purpose, the accuracy in dimensions of the various parts of the motor should be improved.

SUMMARY OF THE INVENTION

An object of the present invention is to provide a thrust bearing in a motor with a worm reduction gear capable of controlling the loss of the motor to be low at an initial stage and effectively moderating a thrust force in the direction of the thrust without particularly improving the accuracy in dimensions of parts.

The thrust bearings in the motor with the worm reduction gear according to the present invention are constructed such that, in the motor with the worm reduction gear, wherein a worm is provided at an end portion of a rotary shaft; a worm wheel is in meshing engagement with the worm; and rotation of the rotary shaft is reduced in speed and transmitted to the load, the motor is characterized in that a plurality of elastic members different in elasticity from each other are provided at end portions in the axial direction of the rotary shaft, and these elastic members are positioned such that, out of these elastic members, at least one elastic member lower in elasticity is adapted to urge the rotary shaft under no load, a thrust force of the rotary shaft acts on the elastic member lower in elasticity under the load, and thereafter, also acts on the elastic member higher in elasticity.

According to the above-described means, the elastic member lower in elasticity acts on the rotary shaft as the prepressure, so that the displacement value of the elastic member can be set at a relatively high value, thereby not requiring high accuracy in dimensions of the parts. Moreover, only the elastic force of the elastic member lower in elasticity acts on the stage where the thrust force of the rotary shaft is low, thus preventing the loss of the motor from being increased.

Then, at the stage where the thrust force from the rotary shaft is increased, the elastic force of the elastic member higher in elasticity also acts on the rotary shaft, so that even a high thrust force can be satisfactorily moderated.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENTS

Figure 1:
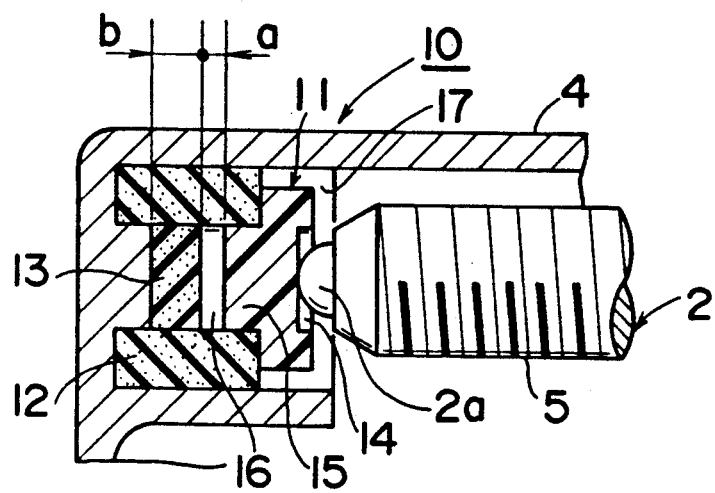
FIG. 1 is an enlarged partially sectional view showing the thrust bearing of the motor with the worm reduction gear.
Figure 2:
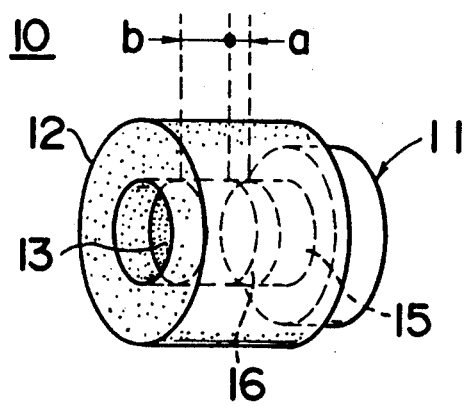
FIG. 2 is an enlarged perspective view showing the damper unit used therein.
Figure 3:
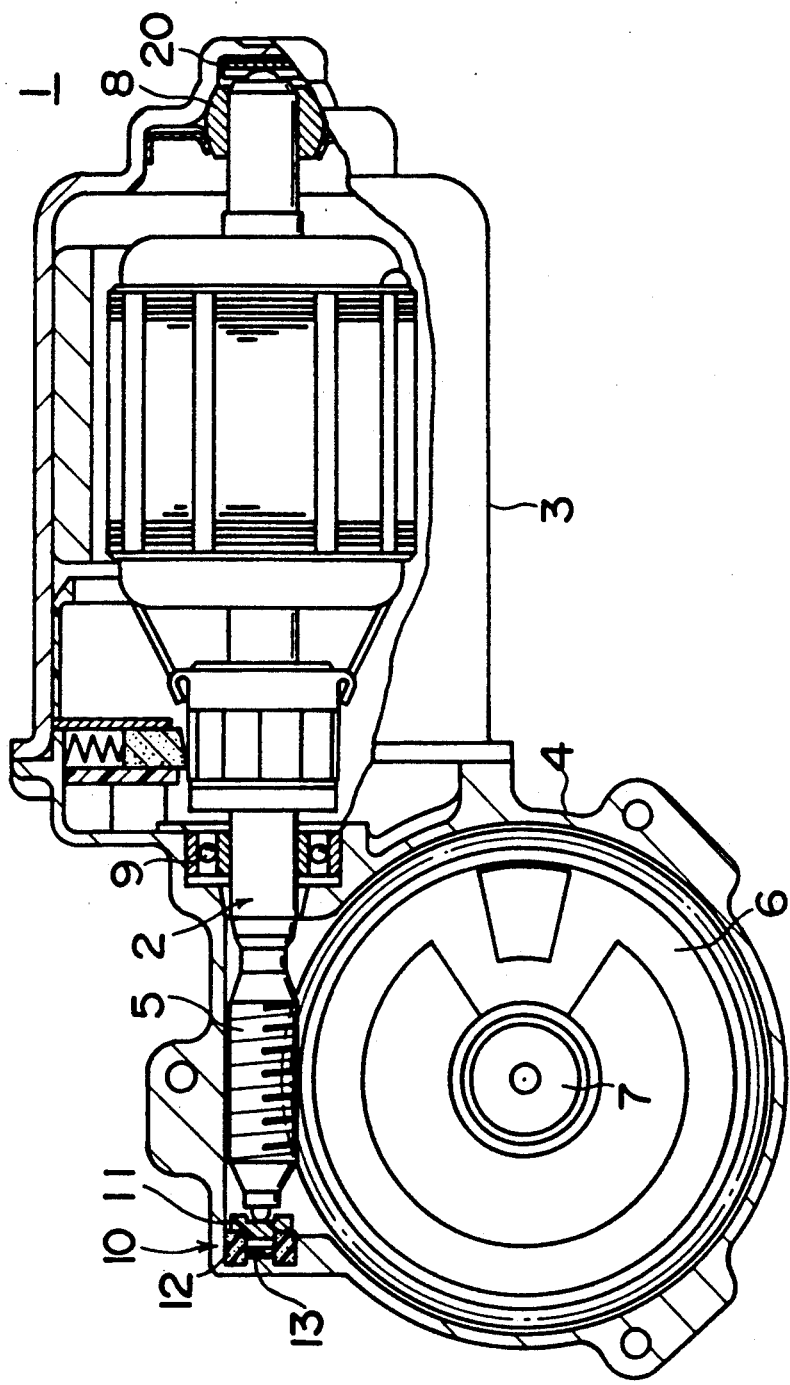
FIG. 3 is a side sectional view showing the motor with the worm reduction gear.
Figure 4:
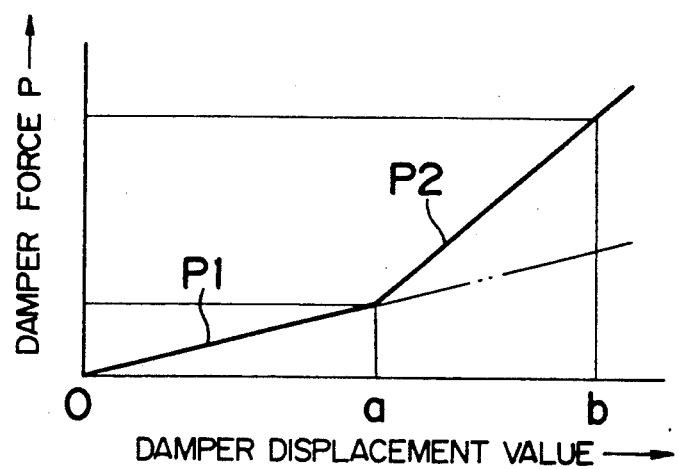
FIG. 4 is a characteristics curve showing the relationship between the damper displacement value and the damper force.

FIG. 1 is the enlarged partially sectional view showing the thrust bearing of the motor with the worm reduction gear as being one embodiment of the present invention. FIG. 2 is the enlarged perspective view showing the damper unit used therein. FIG. 3 is the side sectional view showing the motor with the worm reduction gear in which the damper unit is used. FIG. 4 is the damper characteristics curve showing the relationship between the damper displacement value and the force applied to the damper.

In this embodiment, as shown in FIG. 3, the thrust bearings of the motor with the worm reduction gear according to the present invention are shown as the thrust bearings in a wiper driving device of the motor with the worm reduction gear (hereinafter referred to as a "wiper motor"). A rotary shaft 2 of the wiper motor 1 is provided at an end portion in the axial direction, and rotatably supported by a radial bearing 8 and a radial bearing 9 disposed at the intermediate portion thereof. The wiper motor 1 is provided with a motor housing 3, and a forward end portion of the rotary shaft 2 is housed in a gear housing 4. The gear housing 4 is arranged serially with the motor housing 3 and fixed thereto, and the forward end portion of the rotary shaft 2 is inserted into the gear housing 4 and open-sidedly supported by the radial bearing 9 disposed at the intermediate portion thereof. A worm 5 is formed on the forward end portion of the rotary shaft 2, and a worm wheel 6 is in meshing engagement with the worm 5. The worm wheel 6 is connected through an output shaft 7, a link mechanism and the like, which are not shown, to a wiper shaft fixed thereto with a wiper blade.

In this embodiment, a first thrust bearing 10 and a second thrust bearing 20 are provided at opposite ends of the rotary shaft 2, with the first thrust bearing 10 being interposed between the rotary shaft 2 and gear housing 4 and the second thrust bearing 20 being interposed between the rotary shaft 2 and the motor housing 3, whereby the thrust force acting in the axial direction of the rotary shaft 2 can be supported by the both thrust bearings 10 and 20.

The second thrust bearing 20 is composed of bearing metals and balls, which are interposed between the end surface of the rotary shaft 2 and the motor housing 4.

As shown in FIGS. 1 and 2 in detail, the first thrust bearing 10 is provided with a resin receiver 11 formed of a substantially two-staged disk, a cylindrical first damper 12 and a disk-shaped second damper 13. At the center of a first main surface of the receiver 11, a round hole-shaped concave portion 14 is depressedly formed in a coaxial circle, and, on the other main surface, a short columnar convex portion 15 is raised in a coaxial circle. Then, a ball portion 2a at the forward portion of the rotary shaft 2 is abutted to the concave portion 14, and the first damper 12 is coupled onto the outer peripheral surface of the convex portion 15.

The first damper 12 is formed of a rubber material having low hardness and low in elasticity. The second damper 13 is formed of a rubber material having high hardness and higher in elasticity than the first damper 12. The second damper 13 is inserted into a cylindrical hollow portion of the first damper 12, and a space 16 is formed between opposed surfaces of the convex portion 15 of the receiver 11 and the second damper 13.

That is, as shown in FIG. 4, at a stage where the first thrust bearing 10 is assembled to a bearing mounting portion 17 of the gear housing 4 through this space 16 and a stage where the thrust force from the rotary shaft 2 is low (when a displacement value of the first damper 12 is a ), only the elastic force of the first damper 12 lower in elasticity as shown in characteristics P1 acts on the rotary shaft 2.

Then, when the thrust force from the rotary shaft 2 exceeds a present pressure, the space 16 disappears and the damper displacement value is changed from a to b, the elastic forces of the first damper 12 and also the second damper 13 higher in elasticity act on the rotary shaft 2 over the space 16 as shown in characteristics 2.

Here, after the first thrust bearing 10 is assembled to the bearing mounting portion 17, and, when the rotary shaft 2 is assembled to the motor housing 3 and the gear housing 4, the damper force shown in the characteristics P1 acts in the axial direction of the rotary shaft 2 as the prepressure. However, the inclination of the damper force to the displacement value is small, so that the dispersion of the displacement values in assembling can be set over a wide range, thus not requiring to improve the accuracy in dimensions of the motor housing 3, the gear housing 4, the rotary shaft 2 and the like. Under the normal load, only this prepressure of the first damper 12 acts on, so that the loss of the motor can be prevented from being increased.

On the other hand, when the high thrust force in the direction of the thrust acts on the rotary shaft at the time of the reversion of the wiper blade, both the elastic forces of the first damper 12 and the second damper 13 act on the rotary shaft 2 as shown in the characteristic P2, so that even the high thrust force acting on at the time of the reversion of the wiper blade can be satisfactorily absorbed.

Action will hereunder be described.

When the motor 1 is rotated, the turning force of the motor 1 passes through the worm 5 in the rotary shaft 2 and is transmitted to the worm wheel 6 to rotate the worm wheel 6 in the counterclockwise direction (refer to FIG. 3), and further, transmitted to the output shaft 7 fixed to the worm wheel 6. When the output shaft 7 is rotated, the turning is converted into the reciprocatory motion of a wiper arm through a crank, a connecting rod, a linkage and a wiper shaft, which are not illustrated, whereby, due to this reciprocatory motion, the wiper arm, not shown, causes the wiper blade, not shown, to perform the wiping operation. At this time, the thrust force directed toward the thrust bearing 20 acts on the rotary shaft 2 as a reaction of the load, and the thrust force received by the rotary shaft 2 from the damper is only the prepressure of the first damper 12.

Then, at the time of the reversion, the worm wheel 6 is rotated from the side of the load due to the inertial forces of the wiper blade and the wiper arm. At this time, the thrust force in the axial direction, which instantaneously moves the rotary shaft 2 leftwardly (refer to FIG. 3) due to the worm wheel 6, acts on the rotary shaft 2. However, through the above-described action, this thrust force can be very effectively absorbed by both the elastic forces of the first damper 12 and the second damper 13. In this case, since the second damper 13 is formed of the rubber material having the high hardness, the high thrust force can be effectively absorbed by a slight displacement value.

Figure 5:
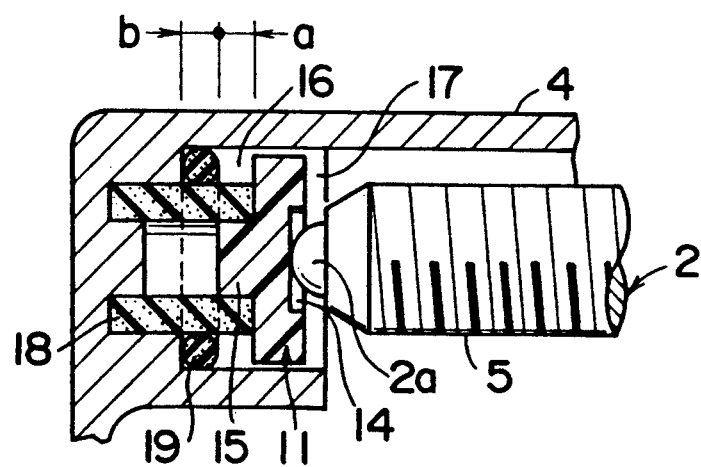
FIG. 5 is an enlarged partially sectional view showing the thrust bearing of the motor with the worm reduction gear as being another embodiment of the present invention.

FIG. 5 is the enlarged partially sectional view showing the thrust bearing of the motor with the worm reduction gear as being another embodiment of the present invention.

In this embodiment 2, a cylindrical first damper 18 smaller in diameter than the first damper 12 shown in FIG. 2 is used, as a second damper 19, an O-ring 19 having the hardness higher than that of the first damper 18 is used, and the convex portion 15 of the receiver 11 is inserted into the hollow portion of the first damper 18. And, in this embodiment 2, a space 16 is formed between the second damper 19 and a large diameter portion of the receiver 11 having a diameter larger than the convex portion 15 thereof.

In this embodiment 2, similarly to the previous embodiment 1, at the stage where the thrust force from the rotary shaft 2 is low (refer to the dimension a), only the elastic force (the characteristics P1) of the first damper 18 acts on the rotary shaft 2, whereas, at the stage where the thrust force exceeds the predetermined pressure (refer to the dimension b) and thenceforth, both the elastic forces of the first damper 18 and the second damper 19 (the characteristics P2) act on the rotary shaft 2.

Due to this, similarly to the previous embodiment 1, the thrust prepressures can be made low, so that the loss of the motor can be controlled to be low. On the other hand, at the time of the reversion of the wiper blade, due to small displacements of the first damper 12 and the second damper 13, the high thrust force can be very effectively absorbed.

As has been described hereinabove, according to the present invention, such an arrangement is adopted that the thrust bearings are constituted by the plurality of elastic members different in elasticity from each other, and, at the stage where the thrust force is low, the thrust force from the rotary shaft is caused to act the elastic member lower in elasticity, while, at the stage where the high thrust force acts on, the thrust force is caused to act on the elastic member higher in elasticity, so that the high thrust force can be very effectively moderated while controlling the loss of the motor to be low at the stage where the thrust force is low.

What is claimed is:

1. A motor comprising a rotary shaft having first and second end faces and a first end portion located adjacent said first end face; a worm reduction gear including a worm on said first end portion of said rotary shaft and a worm wheel in meshing engagement with said worm whereby rotation of said rotary shaft is reduced in speed and transmitted to a load; and a plurality of elastic members different in elasticity from each other located adjacent said first end face of said rotary shaft in the axial direction of said rotary shaft to support thrust forces tending to move said rotary shaft in the direction toward said first end face, said elastic members including at least one elastic member of lower elasticity and one elastic member of higher elasticity, said elastic members being positioned so that said elastic member of lower elasticity urges said rotary shaft in the direction away from said first end face without said member of higher elasticity contributing to the force urging said rotary shaft away from said first end face when small thrust forces in the direction toward said first end face are applied to said rotary shaft and so that when higher thrust forces are applied to said shaft tending to move it toward said first end face both said member of lower elasticity and said member of higher elasticity in combination support the thrust force by both of them urging said rotary shaft in the direction away from said first end face.

2. A motor as set forth in claim 1 wherein said plurality of elastic members constitute a thrust bearing interposed in the axial direction of said rotary shaft between said first end face of said rotary shaft and a housing containing said worm reduction gear.

3. A motor as set forth in claim 2 wherein said elastic member of lower elasticity is a first damper made of an elastic material having a relatively low hardness and said elastic member of higher elasticity is a second damper made of an elastic material higher in elasticity than said first damper.

4. A motor as set forth in claim 3 wherein said thrust bearing includes a receiver interposed between said first and second dampers and said first end face of said rotary shaft.

5. A motor as set forth in claim 4 wherein said receiver has parallel first and second main surfaces facing in opposite directions axially of said rotary shaft, at the center of said first main surface of said receiver a round-hole shaped concave portion is depressedly formed in a coaxial circle, and on said second main surface a convex portion is raised in a coaxial circle.

6. A motor as set forth in claim 5 wherein said first end face of said rotary shaft is pointed and is abutted to said concave portion of said receiver and said first damper is coupled onto said convex portion of said receiver.

7. A motor as set forth in claim 6 wherein said second damper is inserted into a cylindrical hollow portion of said first damper and a space is formed between the convex portion of said receiver and a surface opposed thereto of said second damper.

8. A motor as set forth in claim 6 wherein said first damper is cylindrical and said second damper is disk-shaped.

9. A motor as set forth in claim 6 wherein said first damper is cylindrical and said second damper is formed of an O-ring having a hardness higher than that of said first damper.

10. A motor as set forth in claim 9 wherein said first damper has first and second ends spaced from one another in the axial direction of said rotary shaft and an outer peripheral side extending between its said first and second ends; said second damper is coupled onto said outer peripheral side of said first damper; the convex portion of said receiver is inserted into the hollow portion of said first damper; and a space is formed between a large diameter portion of said receiver and said second damper.

11. A motor as set forth in claim 6 wherein said first damper and said second damper are made of rubber material.

* * * * *